(12) United States Patent
Caldeira et al.

(10) Patent No.: US 9,091,015 B2
(45) Date of Patent: Jul. 28, 2015

(54) ENERGY EFFICIENT DRYER SYSTEMS

(71) Applicant: Elwha LLC, Bellevue, WA (US)

(72) Inventors: Kenneth G. Caldeira, Redwood City, CA (US); Alistair K. Chan, Bainbridge Island, WA (US); Roderick A. Hyde, Redmond, WA (US); Jordin T. Kare, Seattle, WA (US); Nathan P. Myhrvold, Medina, WA (US); Charles Whitmer, North Bend, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 172 days.

(21) Appl. No.: 13/687,836

(22) Filed: Nov. 28, 2012

(65) Prior Publication Data

US 2014/0144036 A1     May 29, 2014

(51) Int. Cl.
*F26B 25/00*        (2006.01)
*D06F 58/20*        (2006.01)
(Continued)

(52) U.S. Cl.
CPC .............. *D06F 58/206* (2013.01); *D06F 58/02* (2013.01); *D06F 58/28* (2013.01); *D06F 2058/287* (2013.01); *D06F 2058/2819* (2013.01); *D06F 2058/2829* (2013.01)

(58) Field of Classification Search
CPC .......... F26B 9/00; F26B 25/00; F26B 25/005; D06F 58/00; D06F 58/20; F24F 3/00; F24F 3/14; F25D 17/00; F25D 17/02; F25D 17/06
USPC ....... 34/80, 86, 90 M, 601, 606, 610; 62/476, 62/487; 68/5 C, 5 R, 19, 20; 8/138, 139, 8/149, 159; 165/54, 909
See application file for complete search history.

(56) References Cited

U.S. PATENT DOCUMENTS 2,627,669 A * 2/1953 Candor ............................ 34/547
2,676,418 A * 4/1954 Shewmon ......................... 34/77
(Continued)

FOREIGN PATENT DOCUMENTS

KR   10-2005-0050293 A    5/2005
WO   WO 2010-114332      10/2010

OTHER PUBLICATIONS

PCT International Search Report; International App. No. PCT/US2013/071695; Feb. 27, 2014; pp. 1-3.
(Continued)

*Primary Examiner* — Steve M Gravini
(74) *Attorney, Agent, or Firm* — Foley & Lardner LLP

(57) ABSTRACT

A dryer including a housing, a drying chamber disposed within the housing, and a heating element coupled to the housing. The dryer further includes an intake configured to supply intake air to the drying chamber and an exhaust vent configured to vent exhaust air out of the drying chamber. The intake, the drying chamber, and the exhaust vent define an air flow path from the intake through the drying chamber and out the exhaust vent. The dryer includes a heat exchanger and a heat pump having a condenser. The heat exchanger and the heat pump are each configured to absorb thermal energy from the exhaust air and transfer the thermal energy to the intake air. The air flow path is configured such that the intake air is heated directly or indirectly by the heat exchanger prior to the intake air being further heated directly or indirectly by the condenser. The air flow path is configured such that the intake air is further heated directly or indirectly by the condenser prior to the intake air entering the drying chamber.

15 Claims, 8 Drawing Sheets

(51) Int. Cl.
*D06F 58/02* (2006.01)
*D06F 58/28* (2006.01)

(56) References Cited

U.S. PATENT DOCUMENTS

| | | | |
|---|---|---|---|
| 3,859,735 A | 1/1975 | Katterjohn, Jr. | |
| 4,063,590 A | 12/1977 | McConnell | |
| 4,471,537 A | 9/1984 | Meda | |
| 4,488,364 A | 12/1984 | Herschel | |
| 4,556,105 A | 12/1985 | Boner | |
| 4,603,489 A | 8/1986 | Goldberg | |
| 4,621,438 A | 11/1986 | Lanciaux | |
| 4,800,655 A | 1/1989 | Mori et al. | |
| 5,117,563 A | 6/1992 | Castonguay | |
| 5,119,571 A * | 6/1992 | Beasley | 34/446 |
| 5,343,632 A | 9/1994 | Dinh | |
| 5,361,511 A * | 11/1994 | Brown | 34/468 |
| 5,675,906 A * | 10/1997 | Li et al. | 34/77 |
| 5,806,204 A | 9/1998 | Hoffman et al. | |
| 6,557,266 B2 | 5/2003 | Griffin | |
| 6,784,997 B2 | 8/2004 | Lorenz et al. | |
| 6,938,356 B2 * | 9/2005 | Nagae et al. | 34/77 |
| 6,941,680 B1 | 9/2005 | Zielewicz et al. | |
| 7,020,985 B2 * | 4/2006 | Casey et al. | 34/595 |
| 7,055,262 B2 | 6/2006 | Goldberg et al. | |
| 7,194,823 B2 | 3/2007 | Nakamoto et al. | |
| 7,197,838 B2 | 4/2007 | Jo | |
| 7,213,349 B1 | 5/2007 | Brunner | |
| 7,325,333 B2 * | 2/2008 | Tadano et al. | 34/604 |
| 7,347,009 B2 | 3/2008 | Ahn et al. | |
| 7,409,776 B2 * | 8/2008 | Ono et al. | 34/77 |
| 7,458,171 B1 * | 12/2008 | Lentz | 34/75 |
| 7,526,879 B2 * | 5/2009 | Bae et al. | 34/596 |
| 7,866,061 B2 | 1/2011 | Tatsumi et al. | |
| 7,908,766 B2 | 3/2011 | Ahn et al. | |
| 7,926,311 B2 * | 4/2011 | Mani et al. | 68/19 |
| 7,971,371 B2 * | 7/2011 | Beaulac | 34/528 |
| 8,056,252 B2 * | 11/2011 | Fernandes | 34/60 |
| 8,082,677 B2 * | 12/2011 | Noviello | 34/60 |
| 8,240,064 B2 | 8/2012 | Steffens | |
| 8,266,824 B2 | 9/2012 | Steiner | |
| 8,353,114 B2 | 1/2013 | Beers et al. | |
| 8,418,376 B2 * | 4/2013 | Steffens et al. | 34/72 |
| 8,418,377 B2 * | 4/2013 | Grunert et al. | 34/86 |
| 8,528,227 B2 * | 9/2013 | Beers et al. | 34/493 |
| 8,601,717 B2 | 12/2013 | Beers et al. | |
| 8,627,581 B2 * | 1/2014 | Brown | 34/603 |
| 8,695,228 B2 * | 4/2014 | Lee et al. | 34/86 |
| 2005/0066538 A1 | 3/2005 | Goldberg et al. | |
| 2006/0117593 A1 | 6/2006 | Ahn et al. | |
| 2006/0179676 A1 | 8/2006 | Goldberg et al. | |
| 2006/0266506 A1 | 11/2006 | Lee et al. | |
| 2006/0266507 A1 | 11/2006 | Eom et al. | |
| 2006/0288602 A1 | 12/2006 | Lee et al. | |
| 2008/0110041 A1 | 5/2008 | Ehlers | |
| 2008/0110044 A1 | 5/2008 | Ehlers | |
| 2008/0113609 A1 | 5/2008 | Ehlers | |
| 2010/0043245 A1 * | 2/2010 | Noviello | 34/60 |
| 2012/0084995 A1 | 4/2012 | Vogel | |
| 2013/0192085 A1 | 8/2013 | Moschutz et al. | |
| 2013/0255331 A1 | 10/2013 | Bommels et al. | |
| 2014/0144036 A1 * | 5/2014 | Caldeira et al. | 34/86 |

OTHER PUBLICATIONS

"Ventless Dryer Guide"; Faster Solutions; Apr. 8, 2013; p. 1-2, LG; located at http://lgwasherdryer.com/ventless-dryer-guide/; printed on Apr. 8, 2013.

PCT International Search Report; International App. No. PCT/US2015/012632; May 12, 2015; pp. 1-5.

* cited by examiner

ENERGY EFFICIENT DRYER SYSTEMS

BACKGROUND

A standard clothes dryer is one of the highest energy consuming home appliances (e.g., a dryer can consume five kW when operating). A clothes dryer generally works by passing heated, dry air over wet articles of clothing and venting heated exhaust air containing water vapor emitted from the wet articles of clothing. The inlet air is generally heated by an electric or gas powered heater. The wet articles of clothing are placed in a tumbler, and the heated air is drawn into the tumbler and passed over and through the articles of clothing. The heated air heats the articles of clothing and any water contained within. Water vapor is carried out of the tumbler with the heated air.

Businesses, such as hotels, laundromats, and clothes cleaners, utilize large, commercial sized dryers. Further, industrial dryers operating on similar principles play substantial roles in various manufacturing areas, including textile manufacturing, food processing, and pharmaceuticals. Industrial dryers may take on a slightly different configuration than their clothes dryer counterparts. For example, an industrial dryer may replace a tumbling mechanism with a conveyor. However, industrial dryers operate on the same basic principles: passing heated dry air over damp articles to carry away water.

SUMMARY

One exemplary embodiment relates to a dryer including a housing, a drying chamber disposed within the housing, and a heating element coupled to the housing. The dryer further includes an intake configured to supply intake air to the drying chamber and an exhaust vent configured to vent exhaust air out of the drying chamber. The intake, the drying chamber, and the exhaust vent define an air flow path from the intake through the drying chamber and out the exhaust vent. The dryer includes a heat exchanger and a heat pump having a condenser. The heat exchanger and the heat pump are each configured to absorb thermal energy from the exhaust air and transfer the thermal energy to the intake air. The air flow path is configured such that the intake air is heated directly or indirectly by the heat exchanger prior to the intake air being further heated directly or indirectly by the condenser. The air flow path is configured such that the intake air is further heated directly or indirectly by the condenser prior to the intake air entering the drying chamber.

Another exemplary embodiment relates a dryer including a housing, a drying chamber disposed within the housing, and a heating element coupled to the housing. The dryer includes an intake configured to supply intake air to the drying chamber and an exhaust vent configured to vent exhaust air out of the drying chamber. The intake, the drying chamber and the exhaust vent define an air flow path from the intake through the drying chamber and out the exhaust vent. The dryer further includes a heat exchanger and a heat pump having a condenser coupled to the drying chamber. The heat exchanger and the heat pump are each configured to absorb thermal energy from the exhaust air. The air flow path is configured such that the intake air is routed through the heat exchanger to heat the intake air prior to entering the drying chamber. The condenser is configured to provide heat to the drying chamber.

An additional exemplary embodiment relates to a dryer including a housing, a tumbler, and a heating element coupled to the housing. The dryer further includes an intake configured to supply intake air to the tumbler and an exhaust vent configured to vent exhaust air out of the tumbler. The intake, the tumbler and the exhaust vent define an air flow path from the intake through the tumbler and out the exhaust vent. The dryer includes a heat pump having a condenser coupled to the tumbler. The heat pump is configured to absorb thermal energy from the exhaust air. The condenser is configured to provide heat to the tumbler.

Yet a further exemplary embodiment relates to method of drying an article in a dryer. The method includes receiving the article in a drying chamber. The article contains moisture. The method further includes heating intake air. The method includes providing heated intake air to the drying chamber. The method includes venting exhaust air containing water vapor out of the drying chamber. The method further includes passing the exhaust air through an evaporator of a heat pump. The method includes passing the exhaust air through a heat exchanger after at least partially passing the exhaust air through the evaporator. The heat exchanger and the heat pump are each configured to absorb thermal energy from the exhaust air and transfer thermal energy to the intake air.

An additional exemplary embodiment relates to a dryer. The dryer includes a housing, a drying chamber disposed within the housing, and a heating element coupled to the housing. The dryer further includes an intake configured to supply intake air to the drying chamber and an exhaust vent configured to vent exhaust air out of the drying chamber. The intake, the drying chamber, and the exhaust vent define an air flow path from the intake through the drying chamber and out the exhaust vent. The dryer further includes a heat exchanger and a heat pump having an evaporator. The heat exchanger and the heat pump are each configured to absorb thermal energy from the exhaust air and transfer the thermal energy to the intake air. The air flow path is configured such that the exhaust air leaving the drying chamber is cooled directly or indirectly by the evaporator prior to the exhaust air being further cooled directly or indirectly by the heat exchanger. The air flow path is configured such that the exhaust air is further cooled directly or indirectly by the heat exchanger prior to the exhaust air exiting the exhaust vent.

The invention is capable of other embodiments and of being carried out in various ways. Alternative exemplary embodiments relate to other features and combinations of features as may be generally recited in the claims.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
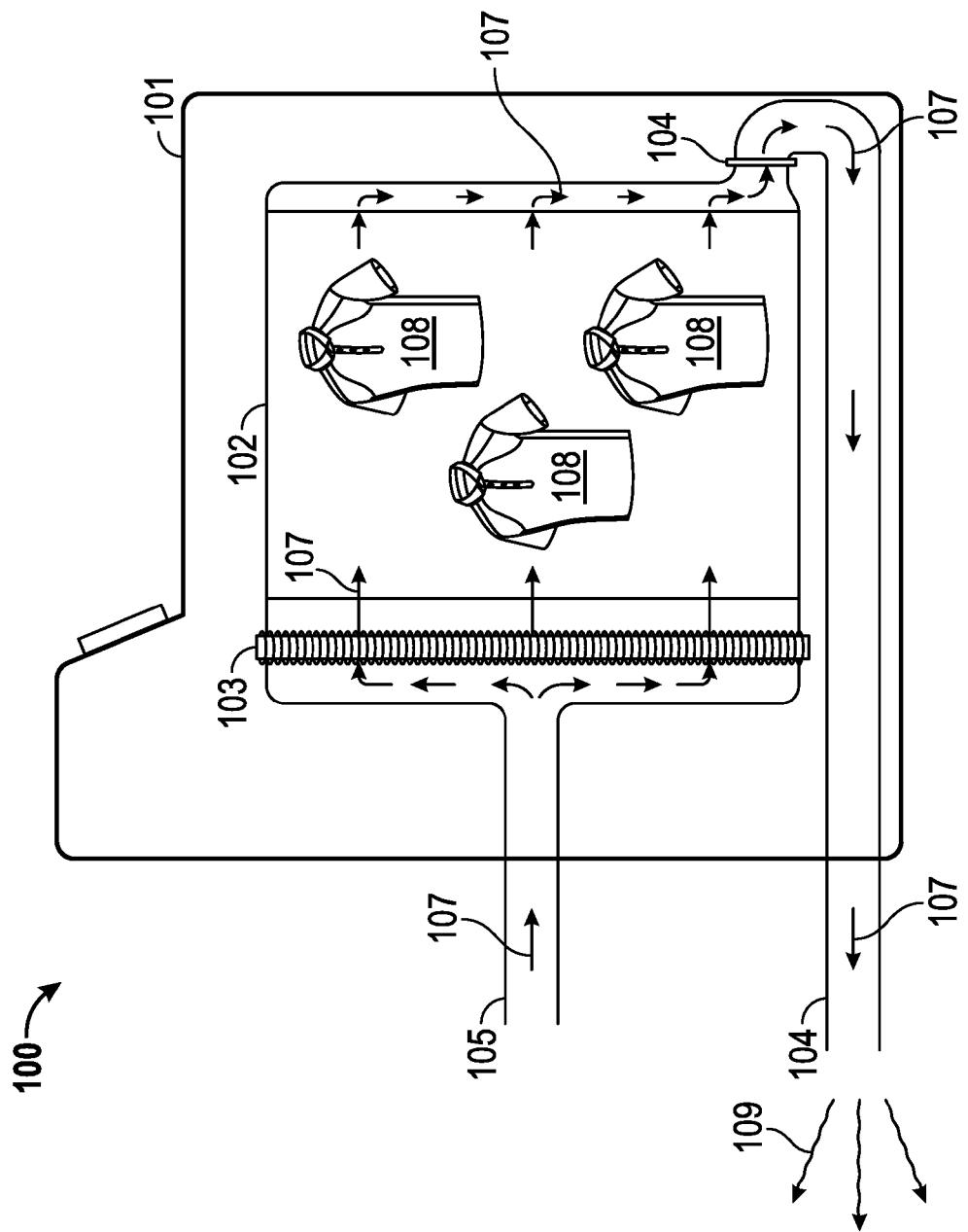
FIG. 1 is a schematic view of a clothes dryer.

Referring to FIG. 1, a simplified schematic view of a traditional clothes dryer system 100 is shown. Clothes dryer 100 has a housing 101 that houses tumbler 102, heating element 103, a series of air routing pipes, and lint trap 104. The air routing pipes include air intake 105 and air exhaust 106. Air 107 enters the clothes dryer 100 through intake 105 such that air 107 is routed over heating element 103. Heating element 103 is typically an electric heating element or a gas heating element. Heating element 103 heats air 107. Heated air 107 then is routed through tumbler 102 where heated air 107 is passed over clothing 107. Air 107 heats up clothing 108 and any water within clothing 108. In the process, air 107 picks up water vapor emitted by clothing 108, and passes out of tumbler 102. Air 107 then passes through lint trap 104 and out of clothes dryer housing 101 through exhaust 106. Air 107 exits exhaust 106 and typically enters the environment outside of the building housing clothes dryer 100.

Air 107 leaving exhaust 106 is generally warmer than the ambient air temperature. Further, exhaust air 107 typically includes water vapor. Energy 109 is lost by clothes dryer 100 when exhaust air 107 leaves clothes dryer 100. The temperature difference between ambient air and the exhaust air 107 represents a potential loss of sensible thermal energy. Further, water vapor contained within exhaust air 107 represents a potential loss of latent thermal energy stored in the phase change of the water from liquid to water vapor.

Figure 2A:
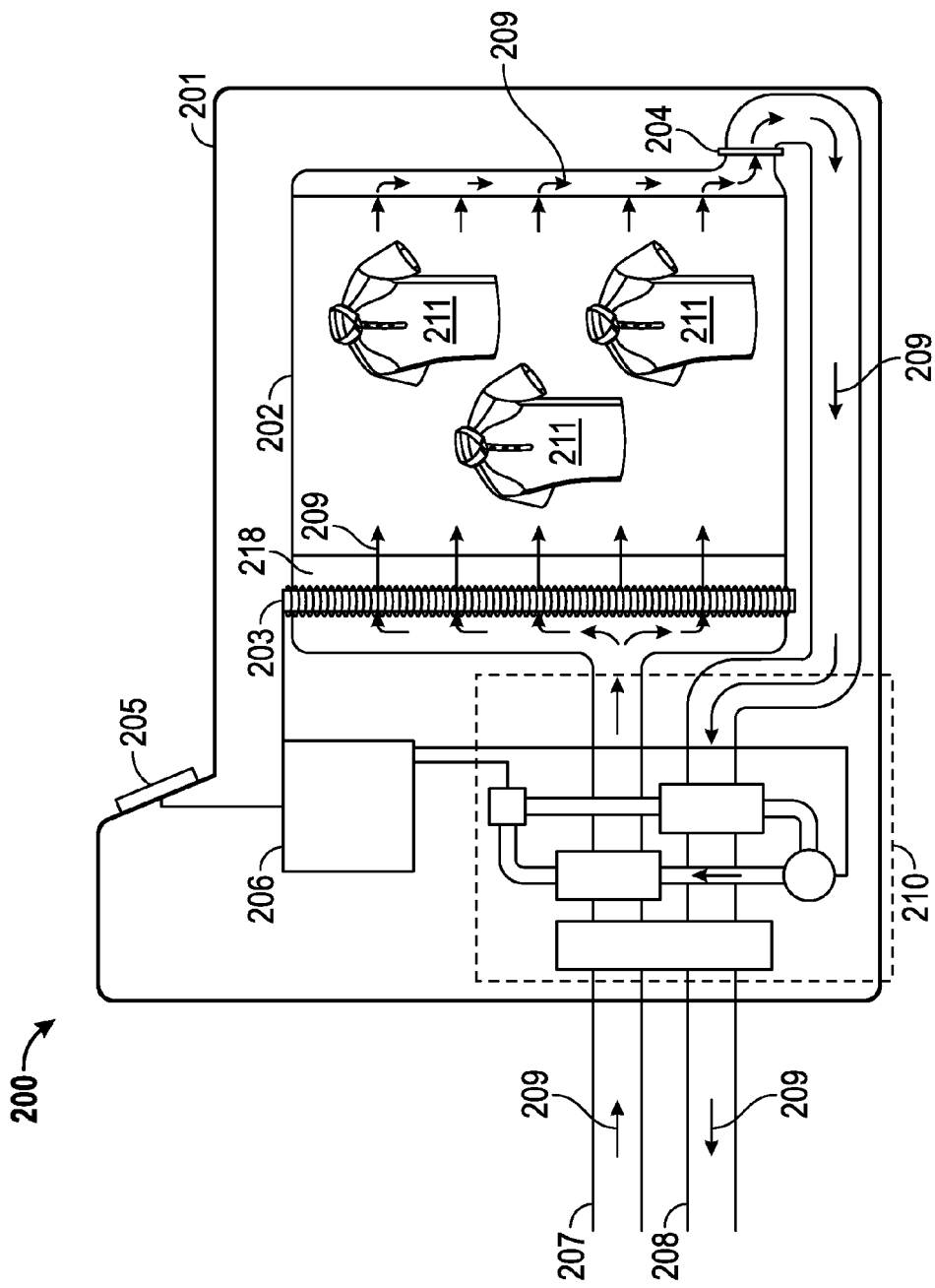
FIG. 2A is a schematic view of an embodiment of an energy efficient clothes dryer.

Referring to FIG. 2A, a schematic view for an energy efficient clothes dryer 200 is provided. Clothes dryer 200 includes a housing 201 that houses a drying chamber, shown as tumbler 202, heating element 203, a series of air routing pipes, and lint trap 204. User interface 205 is located on the exterior of housing 201. Housing 201 additionally houses controller 206. The air routing pipes include air intake 207 and air exhaust 208. Air 209 enters clothes dryer 200 through intake 207 such that air 209 passes through the energy recovery system 210 before passing over heating element 203. Heating element 203 is typically includes an electric heating element or a gas heating element. Heating element 203 heats air 209. Air 209 is then routed through tumbler 202 where air 209 is passed over clothing 211. Alternatively, heating element 203 is at least partially disposed within tumbler 202 such that air 209 within tumbler 202 is heated. Air 209 heats up clothing 211 and any water within clothing 211. In the process, air 209 picks up water vapor emitted from clothing 211 and passes out of tumbler 202. Air 209 is then passed through lint trap 204. Before exiting clothes dryer housing 201 out of exhaust 208, air 209 passes through energy recovery system 210.

As shown above in FIG. 1, clothes dryer 100 is not operable to recapture energy 109 put into the system by heating element 103, and energy 109 escapes clothes dryer 100. However, referring again to FIG. 2A, energy recovery system 210 is configured to extract latent heat energy and sensible heat energy from air 209 before air 209 leaves clothes dryer 200 as exhaust. Further, energy recovery system 210 is configured to input recovered energy into air 209 before it passes over heating element 203. Accordingly, heating element 203 need not input as much energy, and the overall efficiency of clothes dryer 200 is increased.

Figure 2B:
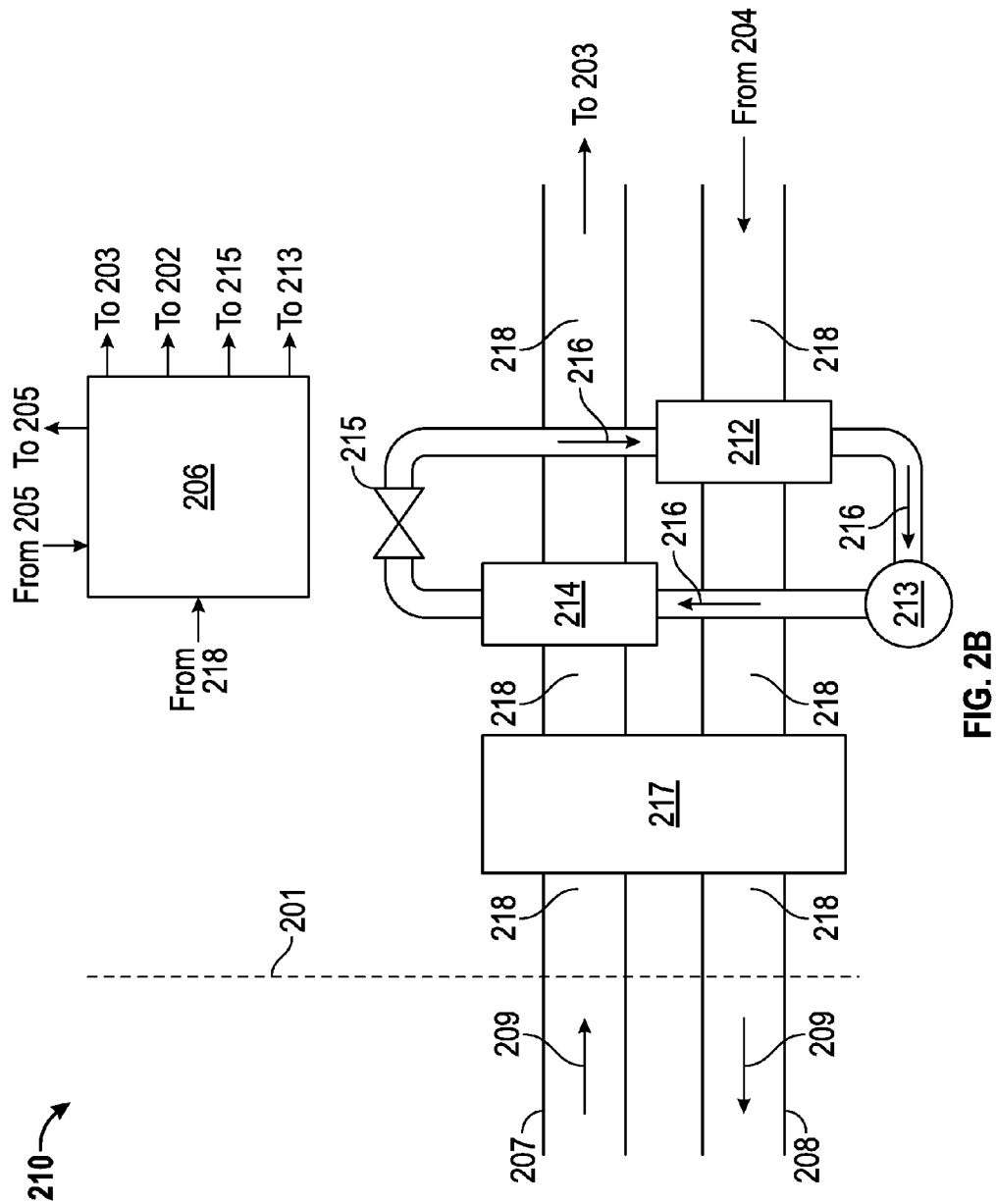
FIG. 2B is a schematic view of an energy capture system for an energy efficient clothes dryer.

Referring to FIG. 2B, a detailed view of energy recovery system 210 is shown. Energy recovery system 210 generally contains a heat pump loop (formed by evaporator 212, compressor 213, condenser 214, expansion valve 215, and refrigerant 216; all operatively connected through hoses and/or pipes) and heat exchanger 217. Air 209 enters energy recovery system 210 after passing through lint trap 204 and out of tumbler 202. At this point in the process, air 209 is hotter than the ambient temperature because air 209 was heated by heating element 203. Further, air contains water vapor given off in the drying process from clothing 211. Air is then routed over evaporator 212. As air and water vapor pass over evaporator 212, refrigerant 216 absorbs thermal energy from air 209. Evaporator 212 can be coupled to the outlet air from the tumbler at a single temperature or over a range of temperatures. Thermal energy is both sensible thermal energy, which causes a temperature drop in air 209, and latent thermal energy, which is released as the water vapor condenses to liquid water. Condensed water can be removed from the system and drained. Air 209 then passes through the energy absorption side of heat exchanger 217 where additional latent and sensible thermal energy from air 209 is captured. Air 209 then vents out of dryer 200 as exhaust air through exhaust 208 into the surrounding atmosphere. In an alternative arrangement, at least a portion of the cooled and dehumidified exhaust air can be recirculated back into dryer 200 through an additional airflow channel.

Fresh air 209 enters the system as intake air. Air 209 flows through the energy transfer side of heat exchanger 217, where thermal energy captured by heat exchanger 217 at the energy absorption side is transferred to air 209. Air passes over condenser 214 where refrigerant 216 transfers thermal energy captured by the heat pump into air 209. Condenser 214 is operable over a temperature range having a maximum value of the tumbler-inlet temperature and a minimum temperature above, at, or below the tumbler-outlet temperature. Both thermal energy transfers to air 209 result in temperature increases over ambient temperature. Air is then passed over heating element 203. Heating element 203 provides minimal energy to air 209 to reach drying temperature resulting in energy savings. Alternatively a heating element is incorporated within the energy recovery system 210. In this case, the heating element is located so as to heat intake air after the air has received heat from heat exchanger 217, but before (or during) its reception of heat from the condenser 214 of the heat pump. In another embodiment, the heating element is incorporated within the heat pump so as to transfer energy to refrigerant 216, thereby increasing the temperature of the condenser 214, or within condenser 214 where air passes over the heating element.

Placement of heat pump components with respect to heat exchanger 217 and heating element 203 can be optimized to improve performance. To maximize efficiency of the energy recovery system 210, evaporator 212 is placed upstream of heat exchanger 217 on the exhaust path, and condenser 214 is placed downstream of heat exchanger 217 on the intake path. Locating condenser 214 and evaporator 212 at thermally hotter portions along the intake path and the exhaust air path, respectively, rather than at thermally cooler portions can be advantageous. Placing evaporator 212 upstream of heat exchanger 217 in the exhaust flow, and placing condenser 214 downstream of heat exchanger 217 in the intake flow is advantageous because it permits delivery of thermal energy to the intake air at higher temperatures than that of the exhaust air exiting the drying chamber. This advantageous placement of heat pump components with respect to heat exchanger 217 increases the dryer's thermal efficiency. Alternatively, evaporator 212 at least partially overlaps with heat exchange 217 such that air 209 transfers thermal energy to both components at the same time. In this alternative arrangement, air 209 is routed through at least a portion of the heat exchanger 217 prior to exiting the evaporator 212 such that air 209 is at least partially cooled by evaporator 212 while being cooled directly or indirectly by heat exchanger 217. In another alternate arrangement, condenser 214 is placed at least partially within heat exchanger 217 such that condenser 214 at least partially overlaps with heat exchanger 217 such that air 209 receives thermal energy from both components simultaneously. In this alternate arrangement, air 209 may be routed through at least a portion of the condenser 214 prior to exiting the heat exchanger 217 such that air 209 is at least partially heated by condenser 214 while being heated directly or indirectly by heat exchanger 217. Accordingly, both evaporator 212 and condenser 214 receive air 209 at higher temperatures than heat exchanger 217. Thus, the temperature differential of air 209 at condenser 214 and evaporator 212 is minimized, and efficiency of the heat pump system is increased. Energy recovery system 210 is shown as a phase-change heat pump system, wherein refrigerant 216 experiences phase changes throughout the standard heat pump cycle. Alternatively, the energy recovery system includes a liquid heat transfer system in which coolant transfers thermal energy from exhaust to inlet air, and the coolant remains a liquid throughout energy recovery system.

Heat exchanger 217 operates to transfer heat from air 209 before it leaves clothes dryer 200 out of exhaust 208 into air 209 entering clothes dryer 200 through intake 207. Heat exchanger 217 is an air-to-air heat exchanger. Alternatively, heat exchanger 217 is an air-to-liquid-to-air heat exchanger. Alternatively, heat exchanger 217 is a heat-pipe heat exchanger. As configured in FIG. 2, heat exchanger utilizes a counter-flow design. Alternatively, heat exchanger may utilize other flow configurations, including a parallel-flow design or cross-flow design and is a tubular heat exchanger. Heat exchanger 217 is configured to transfer both sensible thermal energy and latent thermal energy from air 209 and water vapor leaving as exhaust to air entering clothes dryer 200. Heat exchanger 217 is insulated to facilitate near adiabatic heat exchange.

Controller 206 is configured to control clothes dryer 200 based on user input and feedback from various temperature sensors. Generally, controller 206 includes processing circuitry and memory. Controller 206 is coupled to user interface 205 and is configured to receive user input. User interface 205 is a series of dials and buttons. Alternatively, user interface 205 may be a touch screen device configured to display clothes dryer 200 status and receive input. User interface 205 is configured to receive user input for desired clothes-drying cycle settings, including, but not limited to, temperature, cycle time, and fabric settings. Controller 206 is further configured to receive input from a user designating an energy efficiency setting through user interface 205. The user designated energy efficiency setting may be selected from a listing of designated energy efficiency modes. In a full energy efficiency mode, clothes dryer 200 operates with no heat input from heating element 203. Accordingly, heating element 203 is powered off for the entire cycle while thermal energy is pulled out of exhaust air and deposited into intake air by the heat pump system. Depending on load size, ambient temperature, and load dampness level, such an energy efficiency mode may require a longer load cycle to adequately dry clothes. Alternatively, user input may correspond to a quick-dry mode in which heating element 203 is operated at full power. Further, controller is configured to operate clothes dryer 200 at any combination of settings between the full energy efficiency mode and the quick-dry mode such that both heating element 203 and energy recovery system 210 provide thermal energy to intake air. Controller 206 presents the user designated presets indicating estimated load drying times and energy usage through user interface 205. Alternatively, a user selects the desired drying time or efficiency setting based on a sliding scale such that the user selects a system efficiency that provides the optimum balance of energy efficiency and drying time.

In an exemplary embodiment, controller 206 is coupled to sensors 218. Sensors 218 provide air 209 temperature and humidity feedback at various points of clothes dryer 200. Sensors 218 may be placed at air intake 207 and downstream of heating element 203. In a preferred arrangement, sensors 218 exist at the air intake 217, between heat exchanger 217 and condenser 214 along intake path, between condenser 214 and heating element 203 along the intake path, immediately downstream of heating element 203, inside tumbler 202, immediately upstream of evaporator 212, between evaporator 212 and heat exchanger 217 along the exhaust path, and after heat exchanger 217 at exhaust outlet 208. Accordingly, in the preferred embodiment, controller 206 receives temperature and humidity feedback immediately upstream and downstream of thermal transfer component within energy recovery system 210, at intake 207, at exhaust 209, and within tumbler 202.

In an exemplary embodiment, controller 206 controls the temperature of air 209 as it enters tumbler 202 based on a user selected input received through user interface 205. Controller 206 relies on feedback from sensors 218 to determine whether heating element 203 is to be turned on, turned off, or otherwise adjusted to maintain the temperature of air 209 within tumbler 202 within the desired temperature range. Controller 206 may control the heating element 203 based solely on sensor 218 located downstream from heating element 203. Alternatively, controller 206 relies on readings of multiple sensors 218 located immediately upstream and downstream from heating element 203.

Controller 206 also controls energy recovery system 210 based on user input for the designated clothes dryer efficiency mode. Controller 206 is configured to operate compressor 213 and expansion valve 215 of the heat pump loop. Controller 206 controls compressor 213 speed to increase or decrease pressure of refrigerant 216. Further, controller 206 controls the amount of refrigerant that expansion valve 215 allows into evaporator 212. Controller 206 controls the amount of thermal energy transported from exhaust air to intake air by controlling compressor 213 and expansion valve 215. Controller 206 adjustments are used to maintain desired temperature settings and to maximize the capture of latent heat energy based on humidity feedback.

Figure 3:
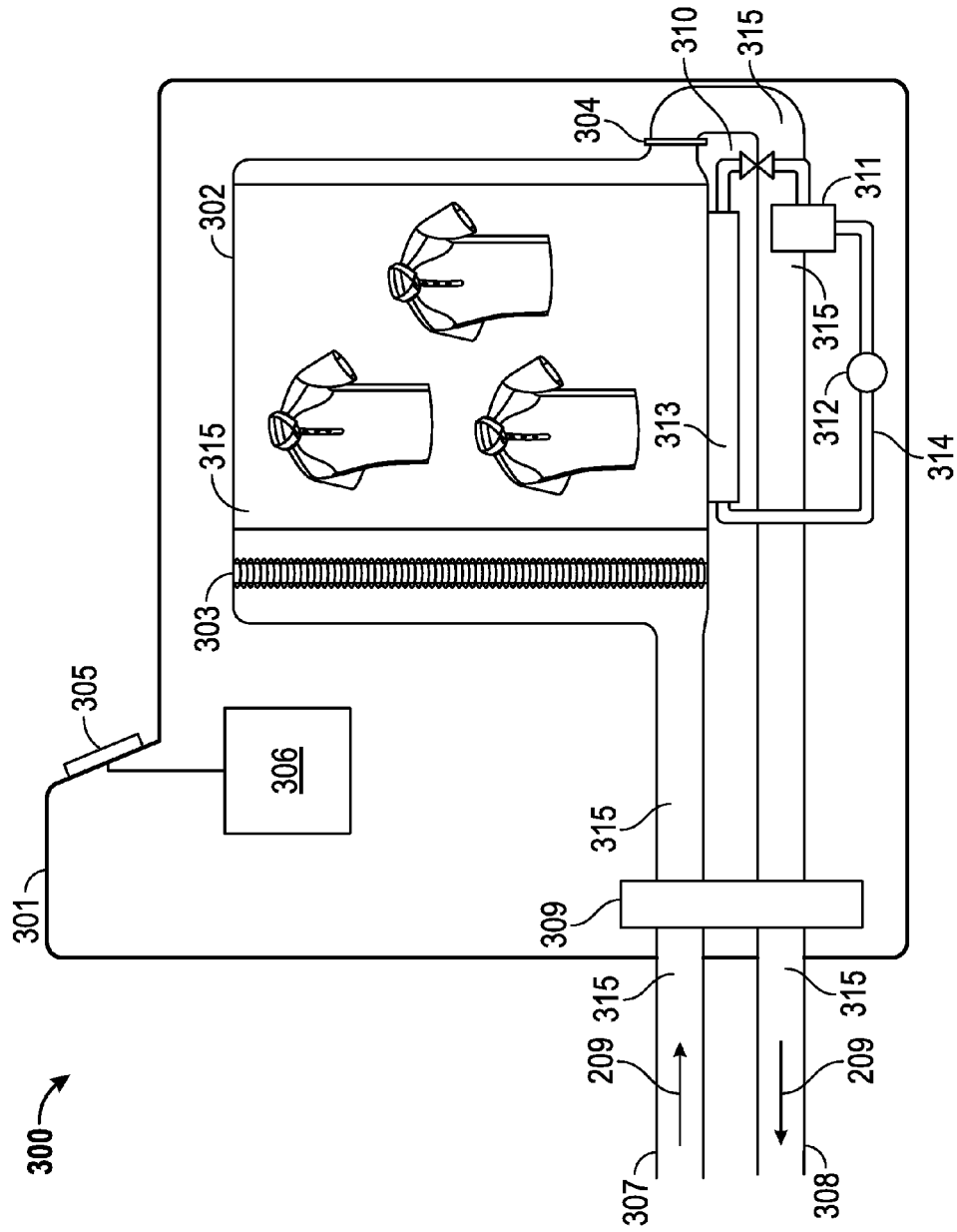
FIG. 3 is a schematic view of another embodiment of an energy efficient clothes dryer.

Referring to FIG. 3, an additional exemplary embodiment of an energy efficient clothes dryer 300 is shown. Clothes dryer 300 is similar to clothes dryer 200. Clothes dryer 300 includes housing 301 that houses a drying chamber, shown as tumbler 302, heating element 303, a series of air routing pipes, and lint trap 304. Clothes dryer further includes user interface 305 to facilitate user input and control. Housing 301 additionally houses controller 306. The air routing pipes include air intake 307 and air exhaust 308. Air 309 enters dryer 300 through intake 307 and exits dryer 300 through exhaust 308. Clothes dryer 300 also includes a heat pump system including expansion valve 310, evaporator 311, compressor 312, condenser 313, and refrigerant 314. In some embodiments clothes dryer 300 additionally includes heat exchanger 309, downstream of evaporator 311 in the exhaust path and upstream of condenser 313 in the intake path, as discussed in context of FIG. 2B. Clothes dryer 300 also includes temperature and humidity sensors 315.

Clothes dryer 300 operates in a similar fashion to clothes dryer 200. However, clothes dryer 300 utilizes condenser 313 to heat tumbler 302 instead of intake air (as performed in clothes dryer 200). Thermal energy is transferred directly to tumbler 302 from condenser 313. Condenser 313 may be mounted directly on tumbler 302. Alternatively, condenser 313 may have a contact surface in contact with tumbler 302. In this arrangement, the contact surface is operative to conduct heat directly from condenser 313 to tumbler 302. In an alternate embodiment, thermal energy is transferred from condenser to tumbler through a secondary heat exchanger. The secondary heat exchanger is a tumbler-mounted heat-pipe. Directly heating tumbler 302 advantageously maintains tumbler 302 at a near-uniform temperature during the drying process.

Controller 306 receives input from user interface and feedback from sensors 315. The user input corresponds to a user desired drying-cycle setting or energy efficiency setting. Controller 306 controls the operation of compressor 312, expansion valve 310, and heating element 303 to achieve the desired drying-cycle setting or energy efficiency setting. Controller 306 controls thermal transfer from exhaust air to tumbler 302 by manipulating the operation of compressor 312 and expansion valve 310. Clothes dryer 300 is shown as utilizing a phase-change based heat pump system, wherein refrigerant 314 experiences phase changes throughout the standard heat pump cycle. Alternatively, clothes dryer 300 utilizes a liquid coolant heat transfer system in which coolant remains a liquid throughout the heat pump loop.

Figure 4:
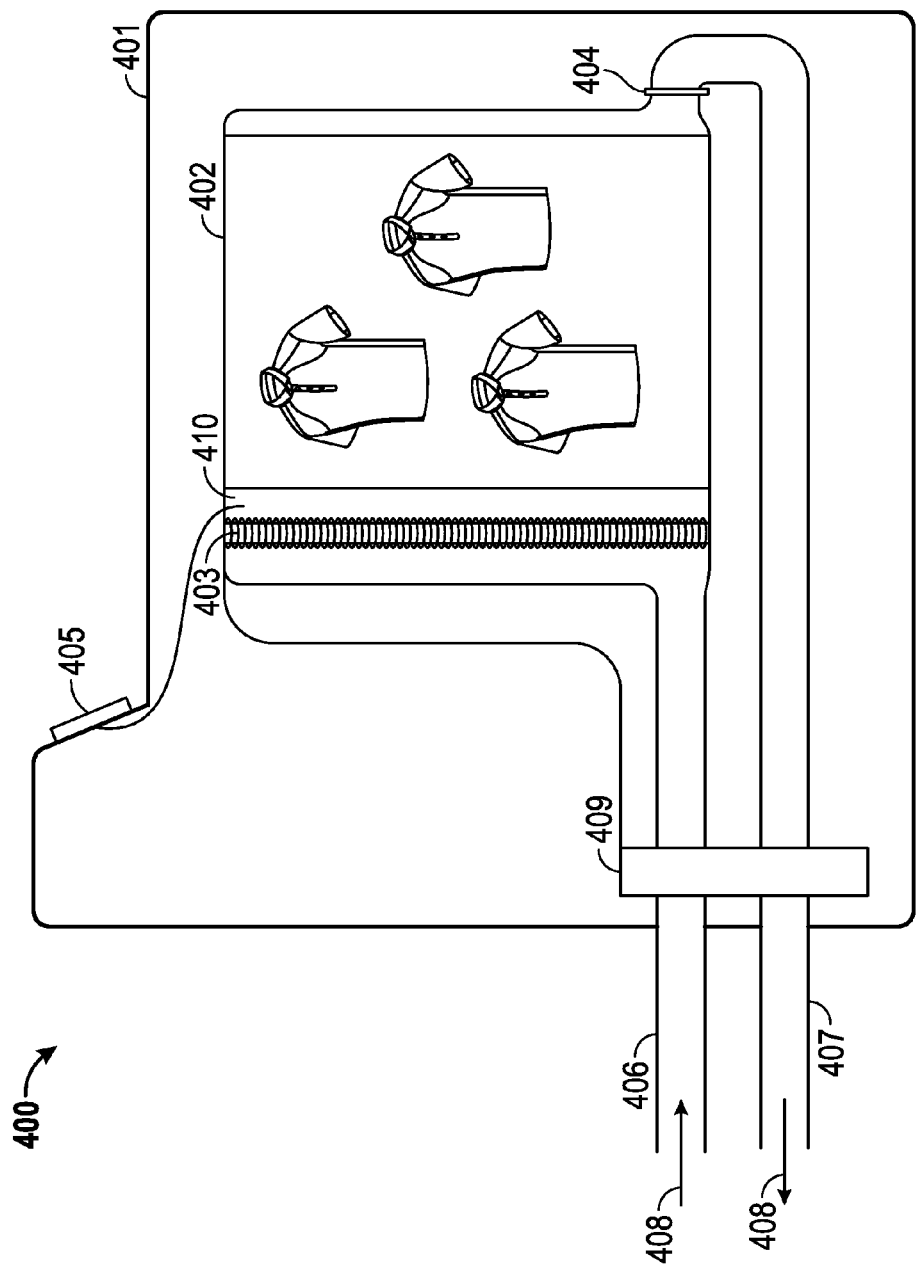
FIG. 4 is a schematic view of a further embodiment of an energy efficient clothes dryer.

Referring to FIG. 4, an alternate exemplary embodiment of an energy efficient clothes dryer 400 is shown. Clothes dryer 400 has housing 401, which houses a drying chamber, shown as tumbler 402, heating element 403, and lint trap 404. Clothes dryer 400 includes user interface 405. Much like dryers 100, 200, and 300, clothes dryer 400 includes an air intake 406 and an air exhaust 407 to facilitate circulating air 408 through dryer 400. Clothes dryer 400 achieves higher efficiency than clothes dryer 100 through the use of heat exchanger 409. Heat exchanger 409 is configured to transfer sensible thermal energy and latent thermal energy from exhaust air to intake air. Heat exchanger 409 is an air-to-air heat exchanger. Alternatively, heat exchanger 409 is an air-liquid-air heat exchanger, in which the liquid serves as a coupling between two heat sinks. The liquid is transported through heat-pipes, wherein the individual heat-pipes may have different thermal set points caused by different refrigerant fluids and different refrigerant fluid pressures.

Because heat exchanger 409 is an air-to-air heat exchanger, heat exchanger 409 is a passive system and requires no electronic control. Accordingly, clothes dryer 400 requires a single temperature sensor 410 and a simple feedback control mechanism for heating element 403. Alternatively, heat exchanger 409 is an air-liquid-air heat exchanger in which coolant is circulated by a pump. In this alternative embodiment, clothes dryer 400 employs multiple temperature sensors 410 such that the flow the coolant is controlled in response to temperature feedback. Alternatively, clothes dryer 400 employs additional sensors 410 around heat exchanger 409 to measure and report system efficiency data to user through user interface 405.

Figure 5:
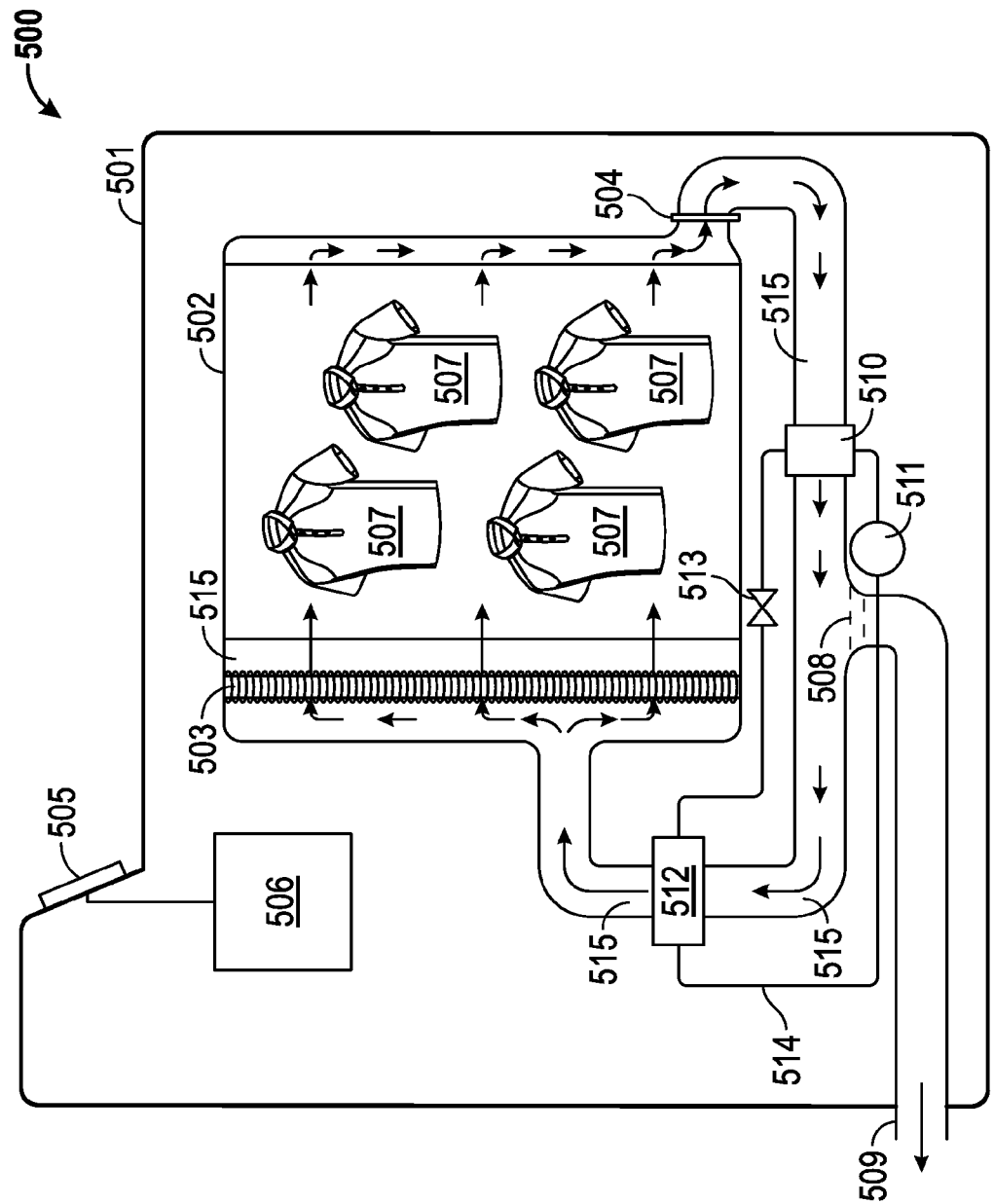
FIG. 5 is a schematic view of an additional embodiment of an energy efficient clothes dryer.

Referring to FIG. 5, clothes dryer 500 is shown in accordance with another exemplary embodiment. Clothes dryer 500 includes housing 501, which houses a drying chamber, shown as tumbler 502, heating element 503, and lint trap 404. Clothes dryer 500 includes user interface 505 and controller 506. Clothes dryer 500 is a generally closed air-path system (i.e. clothes dryer 500 does not include an intake or an exhaust). Air is recirculated within clothes dryer 500. As air is heated and passes over clothing it picks up water vapor. However, merely recirculating hot, damp air would not result in effective drying. Accordingly, clothes dryer 500 utilizes a heat pump system to assist in condensing the water vapor. Condensed water 508 is removed from the recirculated air and exits clothes dryer 500 through drain 509.

Further referring to FIG. 5, the heat pump system includes evaporator 510, compressor 511, condenser 512, expansion valve 513, and refrigerant 514. Heat pump system captures thermal energy in refrigerant 514 from recirculated air and water vapor at evaporator 510. The thermal energy includes both sensible thermal energy and latent thermal energy associated with the condensation of the water vapor into liquid water 508. Heat pump system is configured to dry the recirculated air by condensing the water vapor into water 508. Captured thermal energy is then input back into the dried air through condenser 512. Accordingly, the recirculated air requires minimal heat from heating element 503 before being reintroduced into tumbler 502.

Controller 506 is operable to control compressor 511, expansion valve 513, and heating element 503. Controller 506 receives feedback from sensors 515 and user input from user interface 505. Sensors 515 are configured to provide feedback signals to controller 506, wherein the feedback signals correspond to the temperature and humidity of the recirculated air. Controller 506 can increase or decrease compressor 511 pressure and/or open or close expansion valve 513 in order to increase or decrease the amount of thermal energy captured by refrigerant 514 at evaporator 510.

Each of the above described embodiments (dryers 200, 300, 400, and 500) may be operated as a pay-per-load dryer. A pay-per-load dryer requires payment for use. The pay-per-load dryer system includes one of the energy efficient setups of dryers 200, 300, 400, or 500 and generally requires a user to deposit payment prior to usage of the dryer. The user deposits payment through a payment receiving device. The payment may correspond to a specific drying cycle, an energy saving setting, or a drying time. The payment may be made with coins, with paper currency, with a credit card, from a prepaid account, or via a wireless device (e.g., through a mobile smartphone payment application). Accordingly, the payment receiving device may include a coin receiving slot or tray, a bill receiving and scanning device, a magnetic strip reader, an RFID reader, and a connection to a network (e.g., the Internet). After receipt of the payment, the pay-per-load dryer is activated (or reactivated), and the user can begin (or continue) a designated drying operation.

Figure 6:
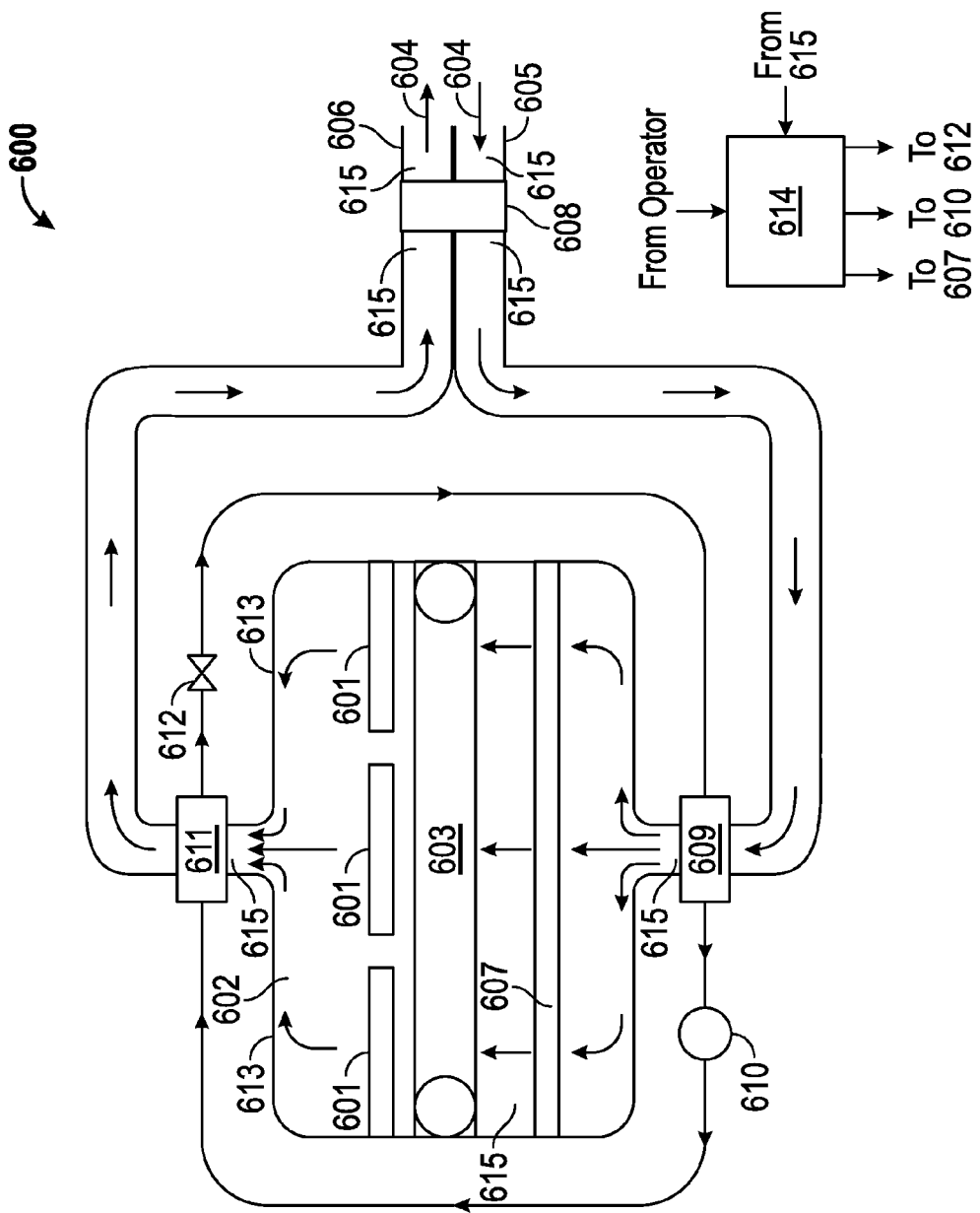
FIG. 6 is a schematic view of an energy efficient industrial dryer.

Referring to FIG. 6, a dryer 600 is shown in accordance with another exemplary embodiment. Dryer 600 is an industrial dryer capable of drying articles 601. Articles 601 enter drying chamber 602 on a delivery mechanism, shown as conveyor 603. Alternatively, the drying chamber includes a tumbler mechanism. It should be understood that any delivery mechanism can be employed by dryer 600. Air 604 enters dryer 600 through inlet 605. Air exits dryer 600 through exhaust 606. Dryer 600 includes heating element 607 (e.g., electric or fuel powered). Air 604 is heated by heating element 607 prior to entering drying chamber 602. Air heats articles 601 and carries off water vapor contained within articles 601. Air 604 is then routed through exhaust 606 where air 604 returns to the ambient environment.

Similar to clothes dryer 200, dryer 600 includes an energy capture system. Energy capture system includes heat exchanger 608 and a heat pump mechanism (including evaporator 609, compressor 610, condenser 611, expansion valve 612, and refrigerant 613). Heat exchanger 608 is an air-to-air heat exchanger in one embodiment. Alternatively, heat exchanger 608 is an air-liquid-air heat exchanger. Heat pump mechanism is shown as a phase-change based heat pump. Alternatively, the heat pump mechanism is a non-phase-change based heat pump and coolant remains in liquid form throughout the entire heat pump cycle. The energy capture system shown in FIG. 6 is configured to extract both latent and sensible thermal energy from heated exhaust air 604 containing water vapor prior to leaving dryer 600 through exhaust 606, and input the captured energy into fresh air 604 entering dryer 600 through inlet 605. Accordingly, after air 604 is heated and passes over articles 601, air 604, including any water vapor, is routed through evaporator 611. At evaporator 611, refrigerant 613 absorbs latent and sensible thermal energy. As air 604 continues towards exhaust 606, air 604 passes through heat exchanger 608. Heat exchanger 608 also absorbs sensible and latent thermal energy from air 604. Air 604 exits through exhaust 606 as fresh air 604 is drawn back into dryer 600 through inlet 605. After entering through inlet 605, air 604 passes through the other side of heat exchanger 608 and receives the energy that heat exchanger 608 previously captured. Air 604 continues to condenser 609, where air 604 receives thermal energy absorbed by refrigerant 613. Accordingly, air 604 reaches heating element 607 at a significantly elevated temperature such that heating element 607 need not to provide as much thermal energy to air 604.

Similar to clothes dryer 200, dryer 600 also includes controller 614 and sensors 615. Sensors are configured to detect air temperature and humidity and provide feedback signals indicating air temperature and humidity to controller 614. Controller 614 is operable to control the operation of dryer 600 through controlling heating element 607, compressor 610, and expansion valve 612 based on feedback from sensors 615 and operator input. Controller 614 controls the various components in the same manner as controller 206 of clothes dryer 200.

Figure 7:
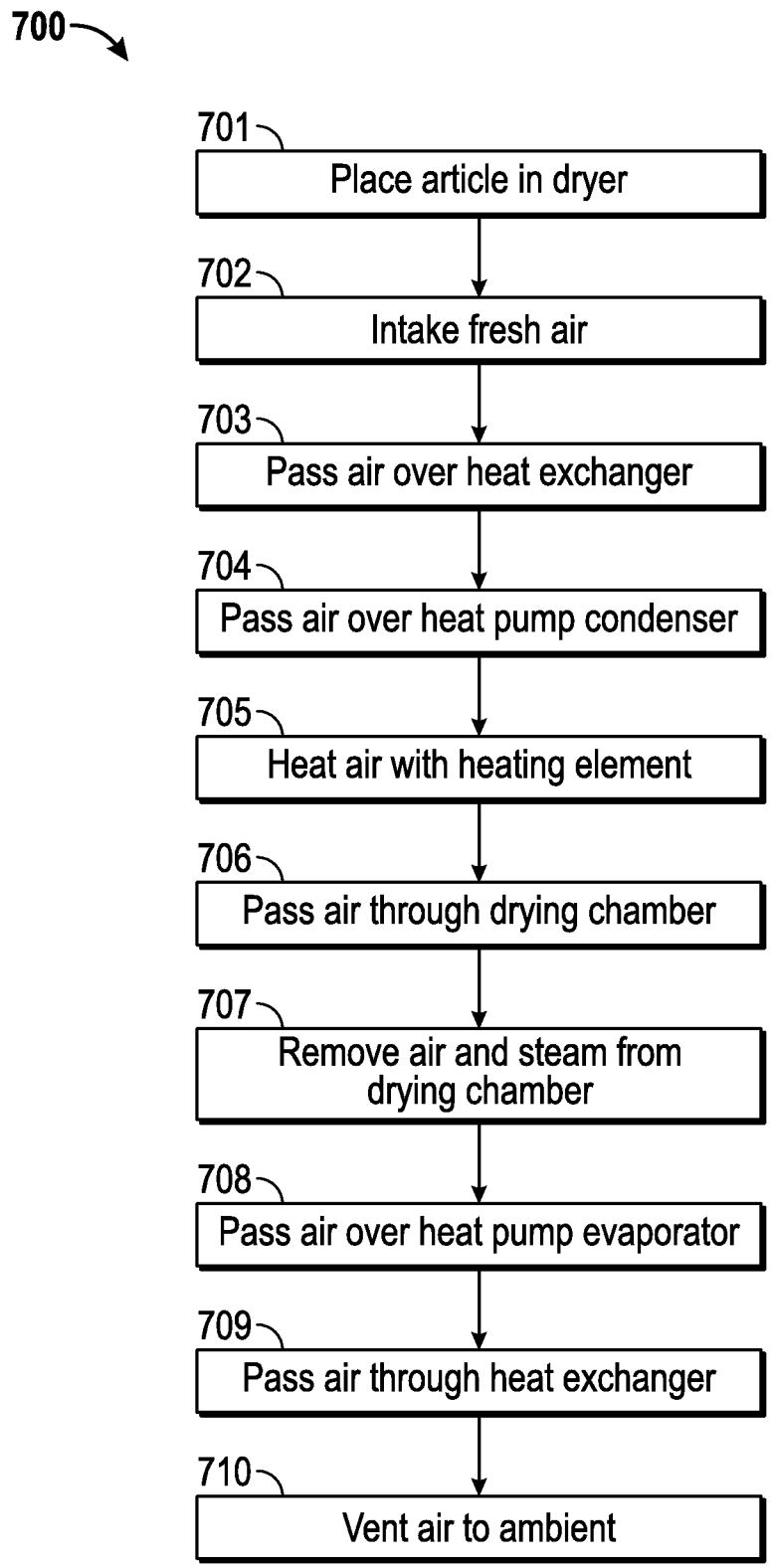
FIG. 7 is a flow chart of a method of drying articles utilizing an energy efficient dryer.

Referring to FIG. 7, a method 700 of drying an article in an energy efficient dryer is disclosed. The method begins with placing an article in a drying chamber of the energy efficient dryer (step 701). The drying chamber includes a tumbling mechanism. Alternatively, the drying chamber is a mechanism operable to the move article through the drying chamber. The energy efficient dryer intakes fresh air from the ambient environment (step 702). The air is passed over a heat exchanger (step 703), where intake air absorbs energy from the heat exchanger that the heat exchanger absorbed from heated exhaust air. The air then flows over a condenser of a heat pump system (step 704). At the condenser, the air absorbs more thermal energy that is carried by a refrigerant within the heat pump system. The air then passes over a heating element (step 705). The heating element inputs more thermal energy into the air. The heating element generates thermal energy through an electric heating element or through burning fuel. The air is then input into the drying chamber and passes over any articles contained within the drying chamber (step 706). The air heats up articles in the dryer and any water contained within the articles. The air exits the drying chamber along with water vapor released by the articles (step 707). After leaving the drying chamber, air and water vapor pass over an evaporator of the heat pump system (step 708). At step 708, refrigerant within the heat pump system absorbs thermal energy from the heated air and water vapor mixture. The refrigerant absorbs latent thermal energy as the water vapor. Further, the refrigerant absorbs sensible thermal energy as the air and water vapor drop in temperature. This thermal energy is reintroduced to fresh intake air at step 704. Downstream of the evaporator, air passes over the opposite side of the heat exchanger (step 709). At step 709, heat exchanger absorbs additional latent and sensible thermal energy from air and water vapor mixture. The thermal energy absorbed at step 709 is input into intake air at step 703. Finally, air and condensed water exit the dryer system (step 710). The steps are repeated on a continuous cycle until the articles in the dryer reach a desired level of dryness.

It should be understood that the above disclosed dryer systems utilize various components to transfer heat from one component to another. It is contemplated that the thermal energy may transfer directly from one component to another, or indirectly through the use of a secondary heat exchanger. For example, referring to FIG. 2B, it is contemplated that a secondary heat exchanger can be used to transfer thermal energy from exhaust air 209 to evaporator 212 or heat exchanger 217. Likewise, it is contemplated that a secondary heat exchanger may be used to transfer thermal energy from heat exchanger 217 or condenser 214 to intake air 209. Any secondary heat exchanger utilized in the above systems may be an air-to-air heat exchanger, an air-to-liquid-to-air heat exchanger, or a heat-pipe heat exchanger. It should also be understood that the above disclosed dryer systems can incorporate ducting to route exhaust air back to the intake, rather than exhausting it to the ambient environment.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed:

1. A dryer, comprising:
a housing;
a drying chamber disposed within the housing;
a heating element coupled to the housing;
an intake configured to supply intake air to the drying chamber;
an exhaust vent configured to vent exhaust air out of the drying chamber;
a heat exchanger; and
a heat pump having a condenser;
wherein the intake, the drying chamber, and the exhaust vent define an air flow path from the intake through the drying chamber and out the exhaust vent;
wherein the heat exchanger and the heat pump are each configured to absorb thermal energy from the exhaust air and transfer the thermal energy to the intake air;
wherein the air flow path is configured such that the intake air is heated directly or indirectly by the heat exchanger prior to the intake air being further heated directly or indirectly by the condenser; and
wherein the air flow path is configured such that the intake air is heated directly or indirectly by the condenser prior to the intake air entering the drying chamber.

2. The dryer of claim 1 wherein the heat pump includes an evaporator.

3. The dryer of claim 2 wherein the air flow path is configured such that the exhaust air leaving the drying chamber is cooled directly or indirectly by the evaporator prior to the exhaust air transferring thermal energy to the heat exchanger.

4. The dryer of claim 3 wherein the air flow path is configured such that the exhaust air is further cooled directly or indirectly by the heat exchanger prior to exiting the exhaust vent.

5. The dryer of claim 3 wherein the exhaust air is at least partially cooled directly or indirectly by the heat exchanger while still being cooled directly or indirectly by the evaporator.

6. The dryer of claim 1 wherein the intake air is at least partially heated directly or indirectly by the condenser while still being heated directly or indirectly by the heat exchanger.

7. The dryer of claim 1, wherein the air flow path is configured to pass the intake air over the heating element after the intake air has been heated directly or indirectly by the heat exchanger.

8. The dryer of claim 1, wherein the air flow path is configured to pass the intake air over the heating element after the intake air has been heated directly or indirectly by the heat pump.

9. The dryer of claim 1 further comprising a controller configured to receive a user input corresponding to a mode of operation for the dryer, wherein the controller is configured to adjust the heating element and adjust an operating parameter of the heat pump in response to the user input.

10. The dryer of claim 9 further comprising a sensor configured to provide a feedback signal indicative of an air temperature to the controller.

11. The dryer of claim 10 wherein the heat pump includes an evaporator and a compressor; wherein the operating parameter of the heat pump is a compressor pressure;
and wherein the controller adjusts the compressor pressure in response to the feedback signal indicative of the air temperature.

12. The dryer of claim 9 further comprising a humidity sensor configured to provide a feedback signal indicative of an air humidity to the controller.

13. The dryer of claim 12 wherein the heat pump includes an evaporator and a compressor; wherein the operating parameter of the heat pump is a compressor pressure;
and wherein the controller adjusts the compressor pressure in response to the feedback signal indicative of the air humidity.

14. The dryer of claim 1, further comprising an airflow channel configured to route air from the exhaust vent back to the intake.

15. A dryer, comprising:
a housing;
a drying chamber disposed within the housing;
a heating element coupled to the housing;
an intake configured to supply intake air to the drying chamber;
an exhaust vent configured to vent exhaust air out of the drying chamber;
a heat exchanger; and
a heat pump having a condenser, an evaporator, and a compressor;

wherein the intake, the drying chamber, and the exhaust vent define an air flow path from the intake through the drying chamber and out the exhaust vent;

wherein the heat exchanger is configured to absorb thermal energy from the exhaust air and to transfer the absorbed thermal energy to the intake air;

wherein the heat pump is configured to absorb thermal energy from the exhaust air via the evaporator and to transfer the thermal energy to the intake air via the condenser;

wherein the air flow path is configured such that the intake air is heated by the heat exchanger prior to the intake air being further heated by the condenser; and wherein the air flow path is configured such that the intake air is heated by the condenser prior to the intake air being heated by the heating element and the intake air entering the drying chamber.

* * * * *